United States Patent [19]

Tashiro et al.

[11] 4,370,228

[45] Jan. 25, 1983

[54] MAGNETIC BELT CONVEYOR TYPE MAGNETIC PARTICLE SEPARATOR

[75] Inventors: Minoru Tashiro; Takaaki Uemura, both of Tokyo, Japan

[73] Assignee: Bunri Industry Co., Ltd., Tokyo, Japan

[21] Appl. No.: 316,940

[22] Filed: Oct. 30, 1981

[30] Foreign Application Priority Data

Nov. 12, 1980 [JP] Japan .............................. 55-159294

[51] Int. Cl.³ .............................................. B01D 35/06

[52] U.S. Cl. .................................... 210/223; 210/396; 210/400

[58] Field of Search ................ 210/223, 396, 400, 222

[56] References Cited

U.S. PATENT DOCUMENTS

| | | | |
|---|---|---|---|
| 3,094,486 | 6/1963 | Goeltz | 210/396 X |
| 3,357,559 | 12/1967 | Isaaelson | 210/223 X |
| 3,975,275 | 8/1976 | Kato | 210/400 X |
| 4,025,433 | 5/1977 | Greenberg | 210/396 X |
| 4,209,403 | 6/1980 | Dorgathen | 210/396 X |

*Primary Examiner*—John Adee

[57] ABSTRACT

A magnetic belt conveyor type magnetic particle separator comprises a storage tank for storing cutting oil containing magnetic particles, an endless belt conveyor extending sidewise from the storage tank in an upwardly inclined direction, and a magnet disposed beneath the forward run of the belt conveyor to extend in the direction of running thereof. Magnetic particles contained in the cutting oil are attracted by the forces of the magnet to the upper surface of the forward run of the belt conveyor to be conveyed up to the forward run end thereof and separated therefrom at the forward run end for being discharged. The magnetic belt conveyor type magnetic particle separator further comprises scrapers mounted on the inner surface of the belt conveyor in a uniformly spaced-apart relation in the direction of running of the belt conveyor and moved in unison therewith over the upper surface of the magnet such as to scrape magnetic particles off the upper surface of the magnet, and projections projecting from the outer surface of the belt conveyor such as to catch masses of magnetic particles rolling over the outer surface of the belt conveyor.

10 Claims, 8 Drawing Figures

MAGNETIC BELT CONVEYOR TYPE MAGNETIC PARTICLE SEPARATOR

BACKGROUND OF THE INVENTION

This invention relates to magnetic belt conveyor type magnetic particle separators for separating magnetic particles from liquid containing such magnetic particles.

The cutting oil or grinding oil having been used in factories generally contains indefinite numbers of magnetic particles. Such magnetic particles have to be removed by separation from the oil for the re-use thereof. As the separator for separating these magnetic particles, a magnetic belt conveyor type separator is well known in the art. The separator comprises an oil storage tank for storing cutting oil containing magnetic particles, a belt conveyor having one end portion extending in the oil storage tank and the other end portion extending therefrom in an upwardly inclined direction, and a magnet disposed beneath and arranged along the forward run of the belt conveyor. With this magnetic particle separator, indefinite numbers of magnetic particles contained in the cutting oil charged into the oil storage tank are attracted by the forces of the magnet to the upper surface of the forward run of the belt conveyor and conveyed up to the forward run end thereof above one side of the oil storage tank for being removed.

The magnetic particles contained in the cutting oil have usually indefinite sizes and shapes and include fibrous or strip-like magnetic pieces or very fine particles. The fibrous or strip-like magnetic pieces tend to gather together and entangle one another to form spherical masses. Such masses of magnetic pieces, when attracted onto the upper surface of the belt conveyor, may roll together and fail to be conveyed to the forward run end of the belt conveyor. Also, very fine magnetic particles are likely to be introduced into a gap between the lower surface of the forward run of the belt conveyor and the upper surface of the magnet to be attracted to the magnet accumulated in the gap. The accumulation of magnetic particles in the gap causes wear of the belt conveyor and reduces the magnetic force of the magnets.

SUMMARY OF THE INVENTION

An object of the invention is to provide a magnetic belt conveyor type magnetic particle separator, which can effectively separate magnetic particles from liquid irrespective of the size or shape of the magnetic particles. Particularly, the invention seeks to provide a magnetic belt conveyor type magnetic particle separator, with which spherical masses of fibrous or strip-like magnetic pieces and very fine magnetic particles tending to be accumulated in the space between the belt conveyor and permanent magnet can be reliably discharged.

To attain the above objective, the magnetic belt conveyor type magnetic particle separator according to the present invention comprises scrapers mounted on the inner surface of the belt conveyor in a spaced-apart relation in the direction of running of the belt conveyor and moved in unison therewith over the upper surface of the magnet such as to scrape magnetic particles off the magnet's upper surface, and projections projecting from the outer surface of the belt conveyor such as to catch masses of magnetic particles rolling over the belt conveyor outer surface.

DETAILED DESCRIPTION OF THE PREFERRED EMBODIMENT

Now, a preferred embodiment of the invention will be described with reference to the accompanying drawings.

Figure 1:
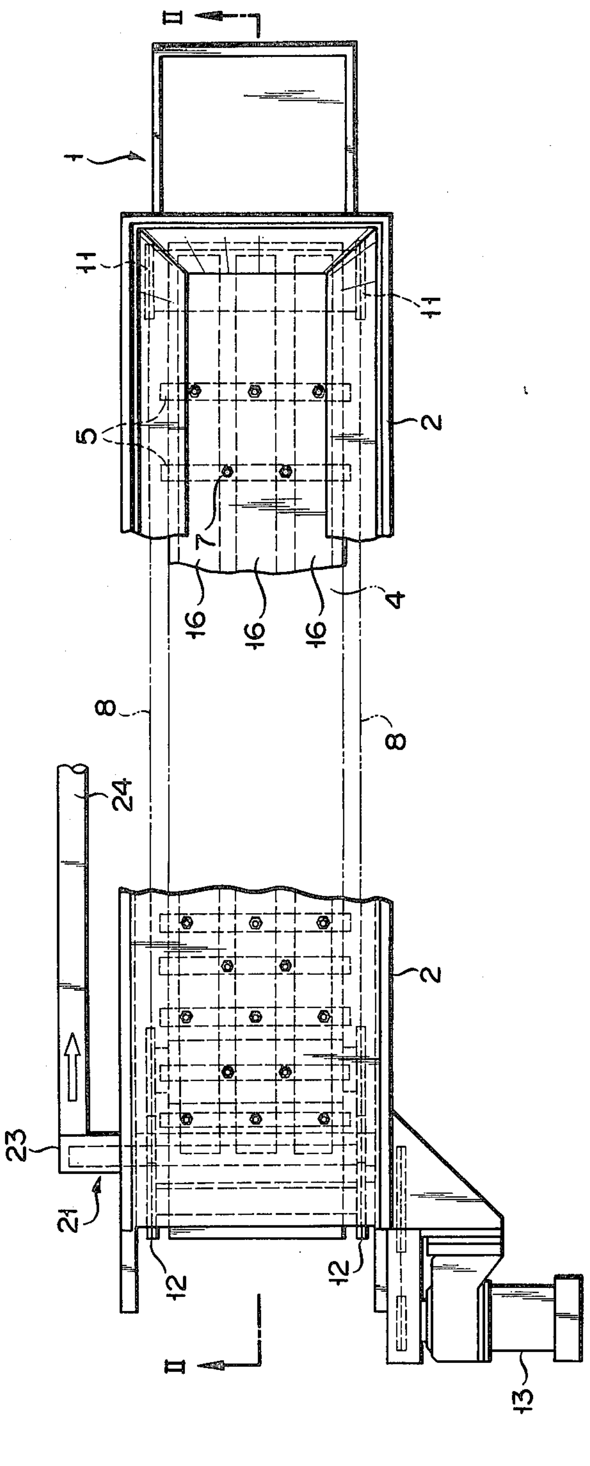
FIG. 1 is a plan view showing an embodiment of the magnetic belt conveyor magnetic particle separator according to the invention.
Figure 2:
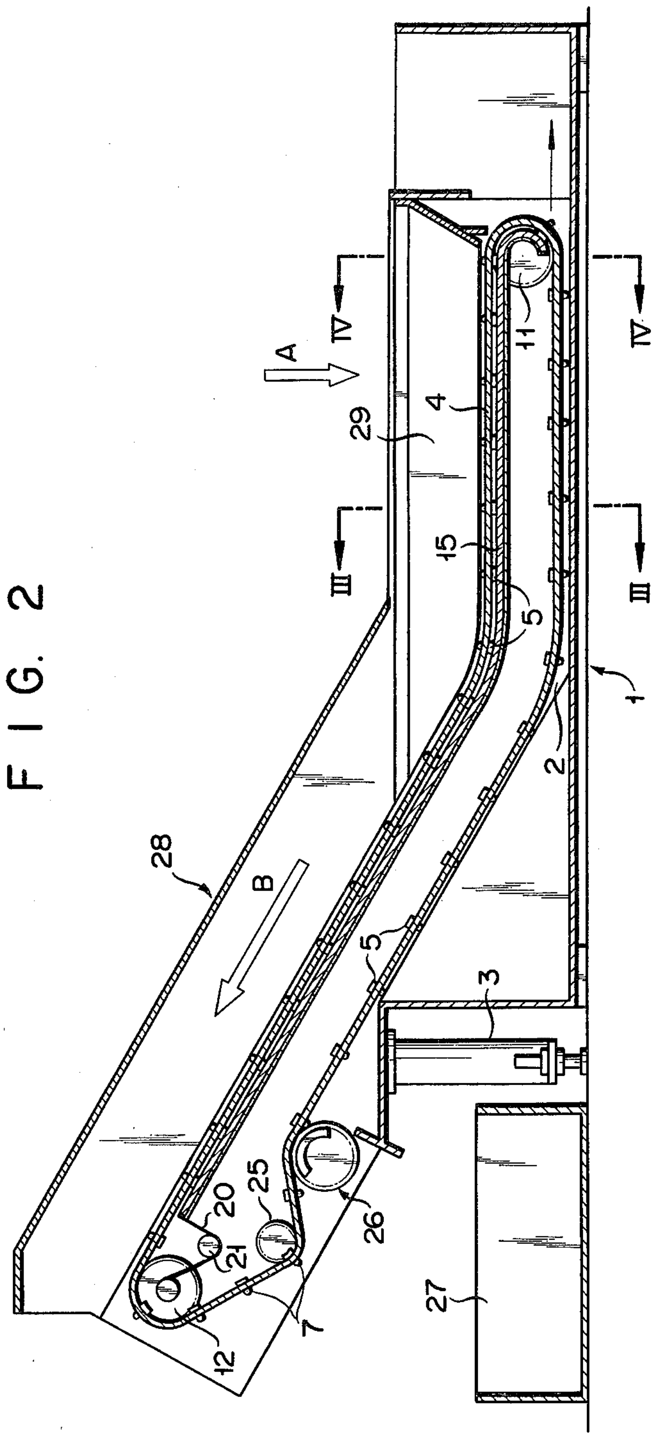
FIG. 2 is a longitudinal sectional view taken along line II—II in FIG. 1.
Figure 3:
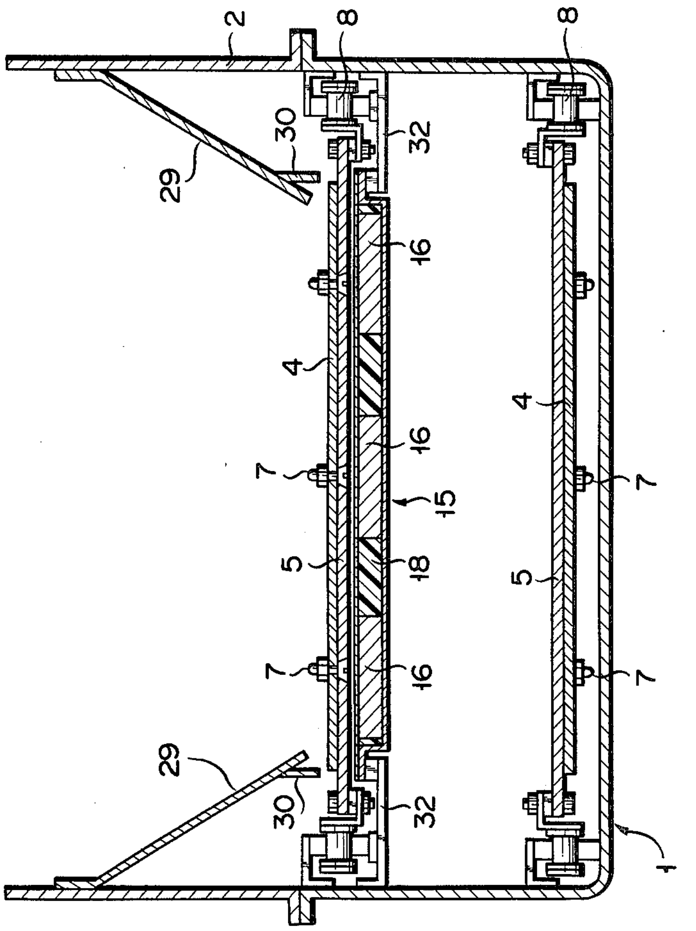
FIGS. 3 and 4 are transversal sectional views taken respectively along lines III—III and IV—IV in FIG. 2.
Figure 4:
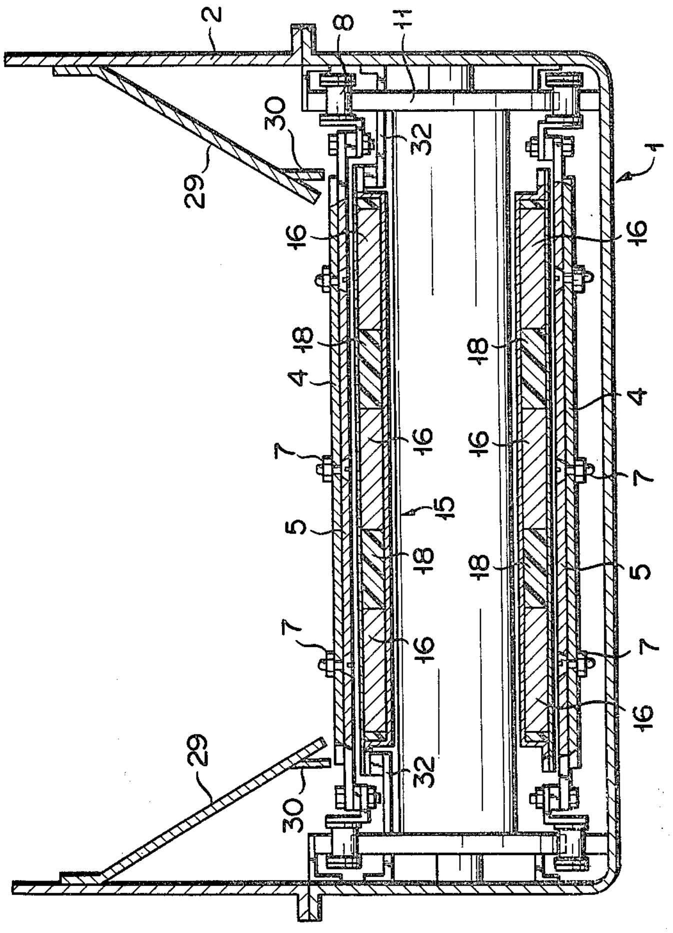

As shown in FIGS. 1 and 2, a magnetic belt conveyor type magnetic particle separator includes an oil storage tank 1, a frame 2 and a belt conveyor 4. Cutting oil discharged from machine tools in a factory and containing magnetic particles is charged into the oil storage tank 1 in the direction of arrow A. One end portion of the frame 2 constitutes part of the side walls of the oil storage tank 1, and the other end portion of the frame 2 extends in an upwardly inclined direction from the oil storage tank. The frame 2 is supported by a pair of legs 3. The belt conveyor 4 is made of an oil-resistant, wear-proof belt material and disposed along the frame 2. More particularly, the belt conveyor 4 has one end portion extending substantially horizontally along the portion of the frame 2 constituting the oil storage tank 1 and the other end portion extending in an upwardly inclined direction from the oil storage tank 1 along the other end portion of the frame. It is driven in the direction of arrow B. A number of scrapers 5 are mounted in a uniformly spaced-apart relation in the direction of its running on its inner side (back side). Each scraper 5 is a rod member of a rectangular cross section extending in the direction perpendicular to the direction of running of the belt conveyor 4. Its length is greater than the width of the belt conveyor, and its opposite end portions project from the belt conveyor. Each scraper 5 is secured by screws 6 to the inner side of the belt conveyor 4. The belt conveyor 4 also has a number of protuberances, for instance spikes 7, projecting from its outer side (front side) and spaced apart at predetermined intervals in its running direction and transversal direction. In the instant embodiment, end portions of the screws 6 penetrate the belt conveyor 4 to the outer side and serve as the spikes 7. The spikes 7 are preferably arranged in a staggered fashion in the running direction of the belt conveyor 4.

Figure 5:
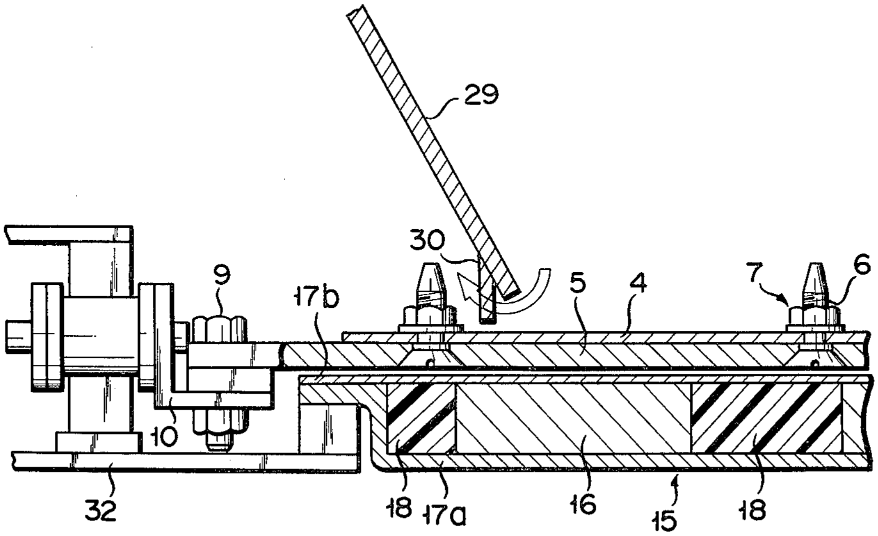
FIG. 5 is an enlarged-scale sectional view of a portion of the separator.

The belt conveyor 4 of the above construction is driven by chains 8 provided on its opposite sides. More particularly, each end of the scraper 5 projected from the belt conveyor 4 is coupled by a connecting bolt 9 and a connecting piece 10 to the associated chain 8, as shown in FIG. 5. The chains 8 are passed round driven sprockets 12 and inverted sprockets 11 which are rotatably mounted on the frame 2, respectively and are disposed along the belt conveyor 4. The drive sprockets 12 are driven by a motor 13 mounted on the frame 2. As the chains 8 are driven by the motor 13 in the direction of arrow B, the belt conveyor 4 is run in the same direction together with the chains 8 via the scraper 5.

Figure 6:
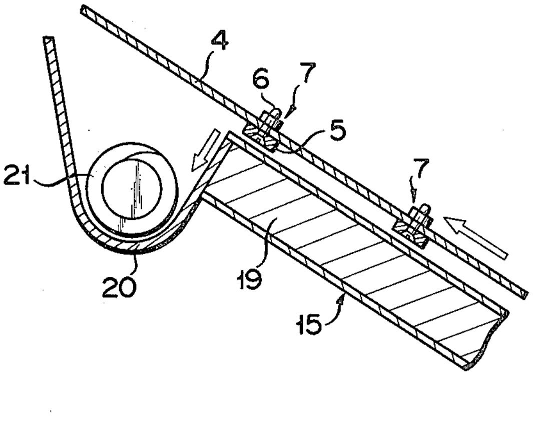
FIGS. 6 and 7 are respectively enlarged-scale sectional view and plan view showing a portion of the separator.
Figure 7:
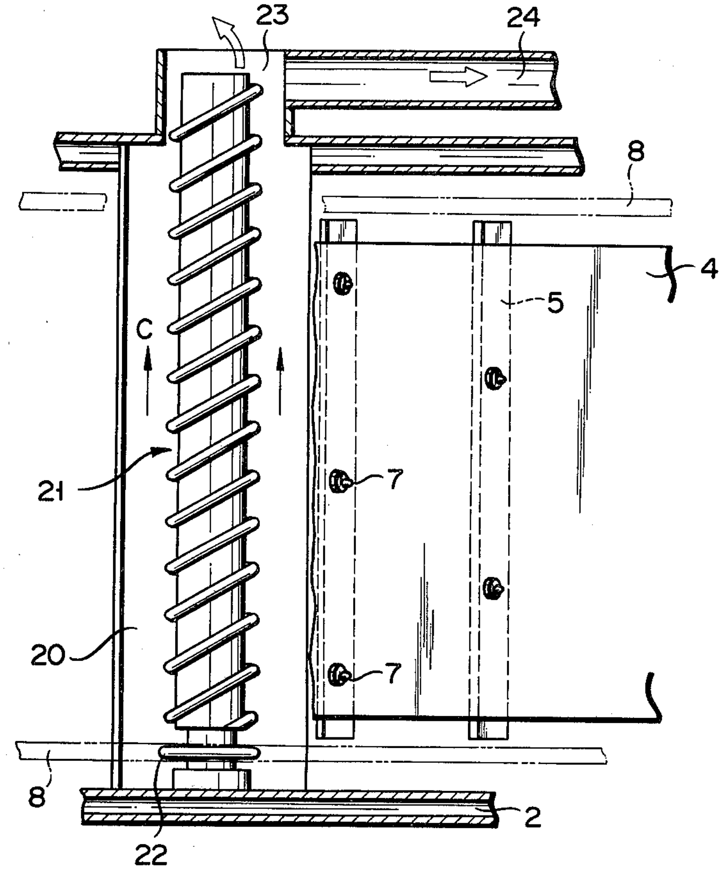

An assembly 15 of magnets is disposed under the forward run of the belt conveyor 4 such that it extends in the direction of running of the belt conveyor. The magnet assembly 15 includes, for instance, three permanent magnets 16 extending in the direction of running of the belt conveyor and arranged in a spaced-apart relation such that the width of the magnet assembly 15 is substantially the same as the width of the belt conveyor 4, and a case 17*a* and a lid 17*b* for accommodating the magnets 16. The case 17*a* is secured by support members 32 to the frame 2. Thc lid 17*b* is made of, for instance, a stainless steel plate. Each lower surface of the scraper 5 is slightly spaced apart from the upper surface of the lid 17*b* and moved parallel to the upper surface of the lid along it. A left end portion of each permanent magnet 16 constitutes an attenuating magnetic force magnet 19 as shown in FIG. 6. A magnetic particle receiving member 20 is connected to the left end of the magnet 15. A screw conveyor 21 is provided inside the receiving member 20. The screw conveyor 21 is rotated by a sprocket 20 meshing with one of the chains 8. A magnetic particle discharge outlet 23 is defined at one end of the receiving member 20. An oil return gutter 24 is disposed in the close proximity of the discharge outlet 23. The oil return gutter 24 communicates with the oil storage tank 1.

As shown in FIG. 2, a tensioning sprocket 25 and a magnet drum 26 are disposed adjacent to the drive sprockets 12 on the side of the backward run of the belt conveyor 4. The frame 2 has an opening formed at the end of its outwardly inclined portion, and a magnetic particle receptacle 27 is disposed beneath the opening. The upper side of the upwardly inclined portion of the frame 2 is covered by a cover 28. Hopper plates 29 are mounted on side wall portions of the frame 2 constituting the oil storage tank 1. The hopper plates 29 have respective filters 30, for instance made of sponge, and depending from their lower edges.

The operation of the magnetic belt conveyor type magnetic particle separator having the above construction will now be described.

Cutting oil supplied from machine tools is discharged into the oil storage tank 1 in the direction of arrow A. Magnetic particles contained in the cutting oil fall and are collected on the upper surface of the forward run of the belt conveyor 4. At this time, the magnetic particles are guided by the hopper plates 29 onto the upper surface of the belt conveyor 4. Magnetic particles approaching the upper surface of the belt conveyor 4 are attracted thereto by the magnetic forces of the magnet assembly 15. As the belt conveyor 4 proceeds in the direction of arrow B, the magnetic particles attracted to the upper surface of the belt conveyor 4 are carried thereby up to the forward run end thereof. At the forward run end of the belt conveyor, the magnetic particles are separated therefrom and fall into the magnetic particle receptacle 27 provided below. Magnetic particles remaining stuck to the belt conveyor 4 due to the viscosity of the cutting oil reach the magnet drum 6 where they are attracted to the side thereof and removed.

Fibrous or strip-like magnetic pieces entangle one another into spherical masses before they are supplied together with oil to the oil storage tank 1. If the belt conveyor has a flat top surface, these spherical masses of magnetic pieces will roll over the belt conveyor and sometimes fail to be conveyed to the forward run end of the conveyor. Since the belt conveyor 4 according to the invention has the spikes 7 projecting from its upper surface, the masses of magnetic pieces are caught on the spikes 7. Thus, these masses of the magnetic pieces are reliably conveyed up to the forward run end of the belt conveyor 4 to be separated therefrom at that end and fall into the receptacle 27.

Very fine magnetic particles are liable to escape sidewise of the conveyor 4 through the gap between the lower edge of each hopper plate 29 and the upper surface of the conveyor 4. However, the filters 30 depending to close the gaps block the magnetic particles. Magnetic particles that may clear even the filters 30 intrude into the gap between the lid 17*b* of the magnet assembly 15 and the lower surface of the forward run of the belt conveyor 4 and accumulate in this gap. However, the scrapers 5 are mounted on the inner surface of the belt conveyor 4 and moved in unison with the belt conveyor over and along the lid 17*b*. Therefore, the magnetic particles having accumulated into the aforementioned gap are scraped off by the scrapers 5 and carried along up to the left hand end of the magnet assembly 15. Since the left hand end portions of the permanent magnets 16 constitute attenuating magnetic force magnets 19, the magnetic particles carried thereto experience attenuating magnetic force of the magnet 16 to eventually fall from the end thereof into the receiving member 20.

The magnetic particles tending to accumulate in the gap between the lower surface of the belt conveyor 4 and the magnet assembly 15 are most effectively removed if the scrapers 5 are mounted such that their lower ends are in frictional contact with the upper surface of the lid 17*b*. In the instant embodiment, however, the scrapers 5 are mounted such that their lower end is slightly spaced apart from the lid 17*b* by taking the wear of the scrapers 5 and lid 17*b* into considerations.

Since the screw conveyor 21 is provided inside the receiving plate 20, the magnetic particles having fallen into the receiving member 20 are conveyed by the screw conveyor 21 in the direction of arrow C to be discharged from the discharge outlet 23. Also, slight cutting oil having been transferred together with magnetic particles to the receiving member 20 is returned through the return gutter 24 to the oil storage tank 1.

It is to be appreciated that with this embodiment whatever magnetic particles can be separated from the cutting oil irrespective of their size or shape.

In the above embodiment, the screws 6 which secure the scrapers 5 to the belt conveyor 4 also serve as the spikes 7. Thus, the number of component parts is reduced to simplify the assembly and construction. However, it is of course possible to use spikes 7 and screws 6 as separate parts.

Figure 8:
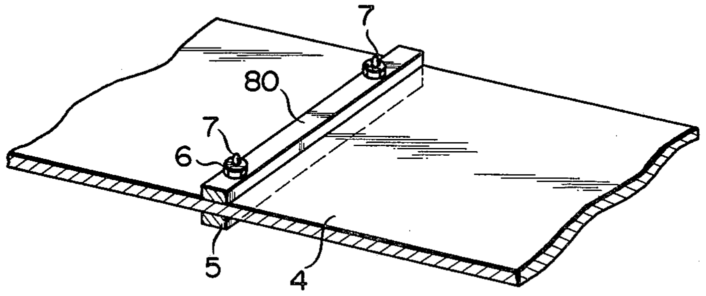
FIG. 8 is a fragmentary perspective view showing a modification of the belt conveyor.

FIG. 8 shows a modification of the above embodiment. In this modification, other scrapers 80 are provided on the outer side of the belt conveyor 4 as well. The conveyor 4 is thus sandwiched between these scrapers 80 and the aforementioned scrapers 5 provided on the inner side of the belt conveyor 4. Here, the spikes 7 may again be constituted by the screws 6 securing the scrapers 5 and 80 to the belt conveyor 4 in the sandwiching relation thereto. The provision of the scrapers 80 on the upper surface of the belt conveyor 4 has an effect of still bettering the magnetic particle transport performance of the belt conveyor 4.

While the above embodiment of the invention has concerned with the separation of magnetic particles contained in the cutting oil, it is by no means limitative, and the invention is also applicable to various other fields such as the separation of minerals in the mining field or the separation of magnetic particles contained in a liquid material in production fields dealing with liquid materials.

What we claim is:

1. In a magnetic belt conveyor type magnetic particle separator comprising a storage tank for storing liquid charged thereto and containing magnetic particles, an endless belt conveyor having one end portion extending in said storage tank and the other end portion extending sidewise from said storage tank in an upwardly inclined direction, and magnet means disposed beneath the forward run of said belt conveyor to extend in the direction of running of said belt conveyor, wherein magnetic particles contained in said liquid are attracted to the upper surface of the forward run of said belt conveyor by the magnetic forces of said magnet means to be conveyed in the state attracted to the belt conveyor up to the forward run end thereof and separated therefrom at said forward run end for being discharged, thereby separating magnetic particles from said liquid; the improvement which further comprises scrapers mounted on the inner side of said belt conveyor in a spaced-apart relation in the direction of running of the belt conveyor and moved in unison therewith over the upper surface of said magnet means to scrape magnetic particles off the upper surface of the magnet means, and protuberances projecting from the outer surfaces of the belt conveyor to catch masses of magnetic particles rolling over the belt conveyor.

2. The magnetic belt conveyor type magnetic particle separator according to claim 1, wherein said scrapers are rod members mounted on said belt conveyor to extend in a direction at right angles to the direction of running of said belt conveyor.

3. The magnetic belt conveyor type magnetic particle separator according to claim 1, wherein said scrapers have a length greater than the width of said belt conveyor and have opposite end portions projecting from the belt conveyor, and which includes chains provided on the opposite sides of the belt conveyor and coupled with said projecting end portions of the scrapers.

4. The magnetic belt conveyor type magnetic particle separator according to claim 1, wherein the lower surface of said scrapers is slightly spaced apart from the upper surface of said magnet means and is moved in a direction parallel to the upper surface of the magnet means.

5. The magnetic belt conveyor type magnetic particle separator according to claim 1, which includes screws each having a portion projecting from the upper surface of said belt conveyor and constituting said projection, said scrapers being mounted on the belt conveyor by said screws.

6. The magnetic belt conveyor type magnetic particle separator according to claim 1, wherein said protuberances project from the belt conveyor outer surface in predetermined spaced-apart relations in the running direction and width direction of the belt conveyor and are arranged in a staggered fashion in the running direction of the belt conveyor.

7. The magnetic belt conveyor type magnetic particle separator according to claim 1, wherein said magnet means includes a plurality of permanent magnets extending in a uniformly spaced-apart relation to each other in the width direction of the belt conveyor such that the width of said magnet means is substantially equal to the width of said belt conveyor.

8. The magnetic belt conveyor type magnetic particle separator according to claim 1, which further comprises other scrapers mounted on the outer surface of said belt conveyor in a spaced-apart relation in the direction of running of the belt conveyor.

9. The magnetic belt conveyor type magnetic particle separator according to claim 8, wherein said other scrapers and said first-mentioned scrapers are mounted on said belt conveyor such as to sandwich the belt conveyor.

10. The magnetic belt conveyor type magnetic particle separator according to claim 9, which includes screws each having a portion projecting from said other scraper and constituting said projection, said other scrapers and said first-mentioned scrapers being mounted on the belt conveyor by said screws.

* * * * *